US009626120B1

(12) United States Patent
Jia et al.

(10) Patent No.: US 9,626,120 B1
(45) Date of Patent: Apr. 18, 2017

(54) SYSTEMS AND METHODS FOR DYNAMICALLY ADJUSTING BATCH REQUEST SIZES

(71) Applicant: Symantec Corporation, Mountain View, CA (US)

(72) Inventors: Yingsong Jia, Beijing (CN); Hong Yu Jia, Beijing (CN)

(73) Assignee: Veritas Technologies, Mountain View, CA (US)

( * ) Notice: Subject to any disclaimer, the term of this patent is extended or adjusted under 35 U.S.C. 154(b) by 0 days.

(21) Appl. No.: 14/979,628

(22) Filed: Dec. 28, 2015

(51) Int. Cl.
*G06F 13/12* (2006.01)
*G06F 13/38* (2006.01)
*G06F 3/06* (2006.01)
*G06F 13/10* (2006.01)

(52) U.S. Cl.
CPC ............ *G06F 3/0631* (2013.01); *G06F 3/067* (2013.01); *G06F 3/0613* (2013.01); *G06F 13/102* (2013.01)

(58) Field of Classification Search
None
See application file for complete search history.

(56) References Cited

U.S. PATENT DOCUMENTS

| | | | | |
|---|---|---|---|---|
| 5,367,523 A * | 11/1994 | Chang | ...................... | H04L 47/10 370/235 |
| 5,724,539 A * | 3/1998 | Riggle | .................. | G06F 3/0613 370/468 |
| 7,711,797 B1 * | 5/2010 | Huang | ................ | H04L 67/2847 709/218 |
| 7,945,731 B2 * | 5/2011 | Tokuda | ................. | G06F 3/0611 707/634 |
| 7,974,199 B2 * | 7/2011 | Stultz | ...................... | H04L 29/06 370/232 |
| 2003/0110206 A1 * | 6/2003 | Osokine | .................. | H04L 47/12 709/201 |
| 2004/0260972 A1 * | 12/2004 | Ji | ......................... | G06F 11/2066 714/11 |
| 2005/0157756 A1 * | 7/2005 | Ormond | .................. | H04L 69/16 370/474 |
| 2006/0290977 A1 * | 12/2006 | Miller-Cushon | ...... | H04L 45/308 358/1.15 |
| 2012/0250671 A1 * | 10/2012 | Kawamoto | ............. | H04L 29/06 370/345 |
| 2016/0119238 A1 * | 4/2016 | Jia | .......................... | H04L 47/12 709/224 |

OTHER PUBLICATIONS

"IOPS", https://en.wikipedia.org/wiki/IOPS, as accessed Nov. 24, 2015, Wikipedia, (Nov. 1, 2005).
Jashua D. Kruck; Systems and Methods for Provisioning Computing Systems With Applications; U.S. Appl. No. 14/073,158, filed Nov. 6, 2013.

* cited by examiner

*Primary Examiner* — Elias Mamo
(74) *Attorney, Agent, or Firm* — FisherBroyles LLP

(57) ABSTRACT

The disclosed computer-implemented method for dynamically adjusting batch request sizes may include (1) identifying a storage system that accepts batched requests for data stored within the storage system, (2) measuring the latency for at least one request sent to the storage system to retrieve a portion of the data stored within the storage system, (3) adjusting, based on the latency of the request, a batch size for the batched requests sent to the storage system, and (4) sending a batched request of the adjusted batched size to the storage system. Various other methods, systems, and computer-readable media are also disclosed.

20 Claims, 7 Drawing Sheets

SYSTEMS AND METHODS FOR DYNAMICALLY ADJUSTING BATCH REQUEST SIZES

BACKGROUND

Provisioning a computing system can be a complicated and error-prone task. The computing system may need to be provisioned with many applications, each of which may need to have settings configured, data entered, and/or files altered. Provisioning multiple computing systems across an entire data center or even several data centers may be significantly more complicated and may involve the tedious and repetitive task of configuring the same enterprise-wide settings again and again. To reduce the complexity and rate of error, many provisioning systems now enable administrators to provision new systems from stored backup images of a fully configured system. Provisioning a new system from a backup image may allow administrators to quickly provision new systems both locally and remotely with a much reduced chance of configuration errors.

Unfortunately, traditional systems for provisioning new systems from backup images may suffer from a variety of inefficiencies. Some traditional systems may aggregate read requests to the backup system in order to improve efficiency. However, sub-optimal read request batch sizes may lead to slow responses from the backup system, increasing the amount of time it takes to provision a new system from a backup and leading to user frustration. Accordingly, the instant disclosure identifies and addresses a need for additional and improved systems and methods for dynamically adjusting batch request sizes.

SUMMARY

As will be described in greater detail below, the instant disclosure describes various systems and methods for dynamically adjusting batch request sizes by increasing the batch request size during periods of high latency and decreasing the batch request size during periods of low latency. By dynamically adjusting batch request size based on latency, the systems described herein may enable data storage systems to return requests more efficiently.

In one example, a computer-implemented method for dynamically adjusting batch request sizes may include (1) identifying a storage system that accepts batched requests for data stored within the storage system, (2) measuring the latency for at least one request sent to the storage system to retrieve a portion of the data stored within the storage system, (3) adjusting, based on the latency of the request, a batch size for the batched requests sent to the storage system, and (4) sending a batched request of the adjusted batched size to the storage system.

In some examples, adjusting the batch size may include increasing the batch size in response to determining that the latency of the request is higher than a previously measured latency that was previously used to set the batch size and/or decreasing the batch size in response to determining that the latency of the request is lower than a previously measured latency that was previously used to set the batch size. In one embodiment, the storage system may include a backup storage system and/or the batched request may include a batch of read requests made in order to provision a system from the backup storage system.

In some examples, the computer-implemented method may further include (1) determining that a certain request in the batched request is expected to take longer than a predetermined time limit to return, (2) assigning the certain request to a subsequent batched request, and (3) returning all requests in the batched request except the certain request. In one example, the certain request may be expected to take longer than the predetermined time limit because the certain request may be expected to pass through several layers of systems.

In one embodiment, the computer-implemented method may further include determining that a group of requests in the batched request are requesting data stored in a group of data containers and sorting the requests in the batched request according to the data containers the requests are requesting the data from. In some embodiments, the computer-implemented method may further include assigning the sorted requests to a group of threads in a multi-threaded system, where each request to the same data container is assigned to the same thread within the group of threads.

In one embodiment, a system for implementing the above-described method may include (1) an identification module, stored in memory, that identifies a storage system that accepts batched requests for data stored within the storage system, (2) a measuring module, stored in memory, that measures the latency for at least one request sent to the storage system to retrieve a portion of the data stored within the storage system, (3) an adjusting module, stored in memory, that adjusts, based on the latency of the request, a batch size for the batched requests sent to the storage system, (4) a sending module, stored in memory, that sends a batched request of the adjusted batched size to the storage system, and (5) at least one physical processor configured to execute the identification module, the measuring module, the adjusting module, and the sending module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a storage system that accepts batched requests for data stored within the storage system, (2) measure the latency for at least one request sent to the storage system to retrieve a portion of the data stored within the storage system, (3) adjust, based on the latency of the request, a batch size for the batched requests sent to the storage system, and (4) send a batched request of the adjusted batched size to the storage system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
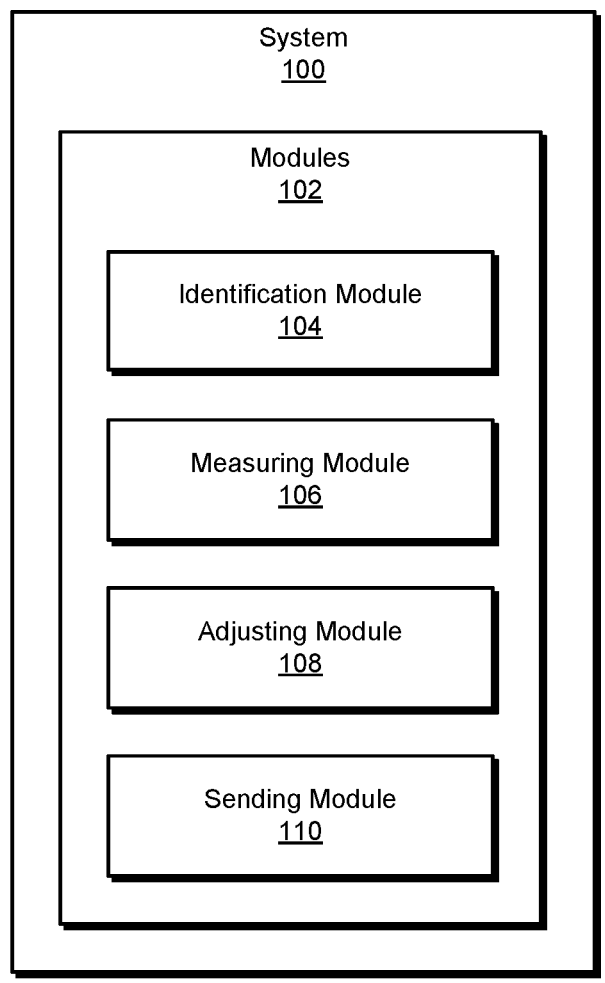
FIG. 1 is a block diagram of an exemplary system for dynamically adjusting batch request sizes.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for dynamically adjusting batch request sizes. As will be explained in greater detail below, by increasing batch request sizes during periods of high latency and decreasing batch request sizes during periods of low latency, the systems described herein may improve the efficiency of storage systems at returning requests. By improving the efficiency of storage systems in this way, the systems described herein may increase the efficiency of provisioning new systems from backup storage systems, increasing overall provisioning efficiency and decreasing user frustration with the provisioning process.

Figure 2:
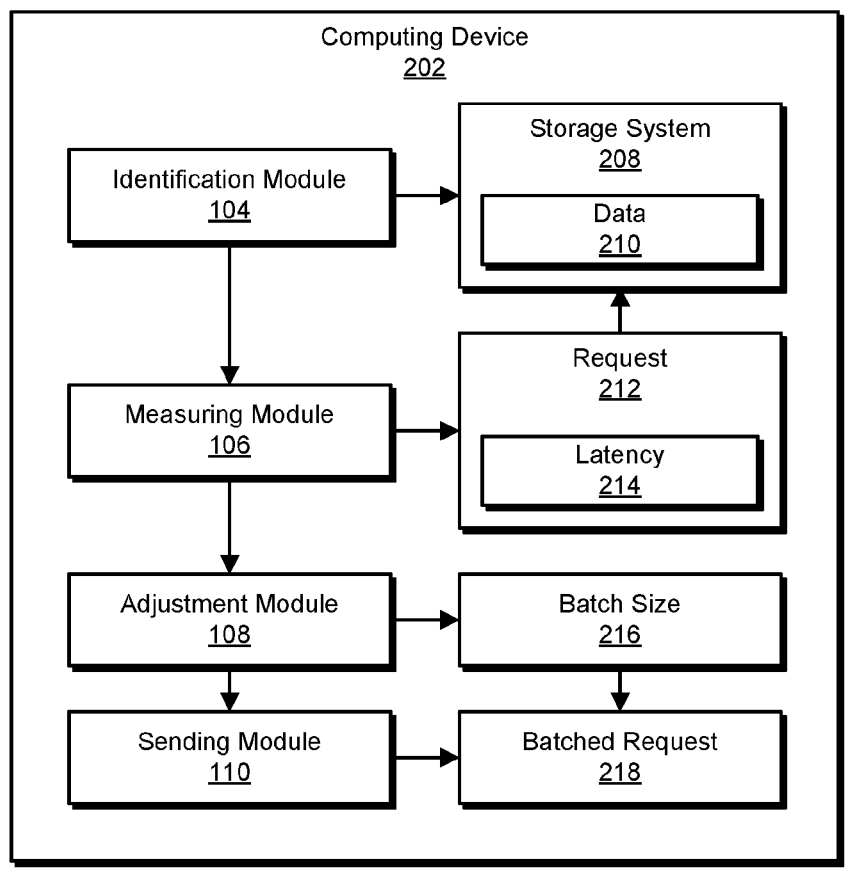
FIG. 2 is a block diagram of an additional exemplary system for dynamically adjusting batch request sizes.

The following will provide, with reference to FIGS. 1-2 detailed descriptions of exemplary systems for dynamically adjusting batch request sizes. Detailed descriptions of corresponding computer-implemented methods will also be provided in connection with FIG. 3. Detailed descriptions for additional efficiency improvements to request efficiency will be provided in connection with FIGS. 4-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for dynamically adjusting batch request sizes. As illustrated in this figure, exemplary system 100 may include one or more modules 102 for performing one or more tasks. For example, and as will be explained in greater detail below, exemplary system 100 may include an identification module 104 that identifies a storage system that accepts batched requests for data stored within the storage system. Exemplary system 100 may additionally include a measuring module 106 that measures the latency for at least one request sent to the storage system to retrieve a portion of the data stored within the storage system. Exemplary system 100 may also include an adjusting module 108 that adjusts, based on the latency of the request, a batch size for the batched requests sent to the storage system. Exemplary system 100 may additionally include a sending module 110 that sends a batched request of the adjusted batch size to the storage system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102.

In one embodiment, one or more of modules 102 from FIG. 1 may, when executed by at least one processor of computing device 202, enable computing device 202 to dynamically adjust batch request sizes. For example, and as will be described in greater detail below, identification module 104 may identify a storage system 208 that accepts batched requests for data 210 stored within storage system 208. At regular intervals, measuring module 106 may measure a latency 214 for at least one request 212 sent to storage system 208 to retrieve a portion of data 210 stored within storage system 208. Next, adjusting module 108 may adjust, based on latency 214 of request 212, a batch size 216 for the batched requests sent to storage system 208. At some later time, sending module 110 may send a batched request 218 of the adjusted batched size to storage system 208.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Figure 3:
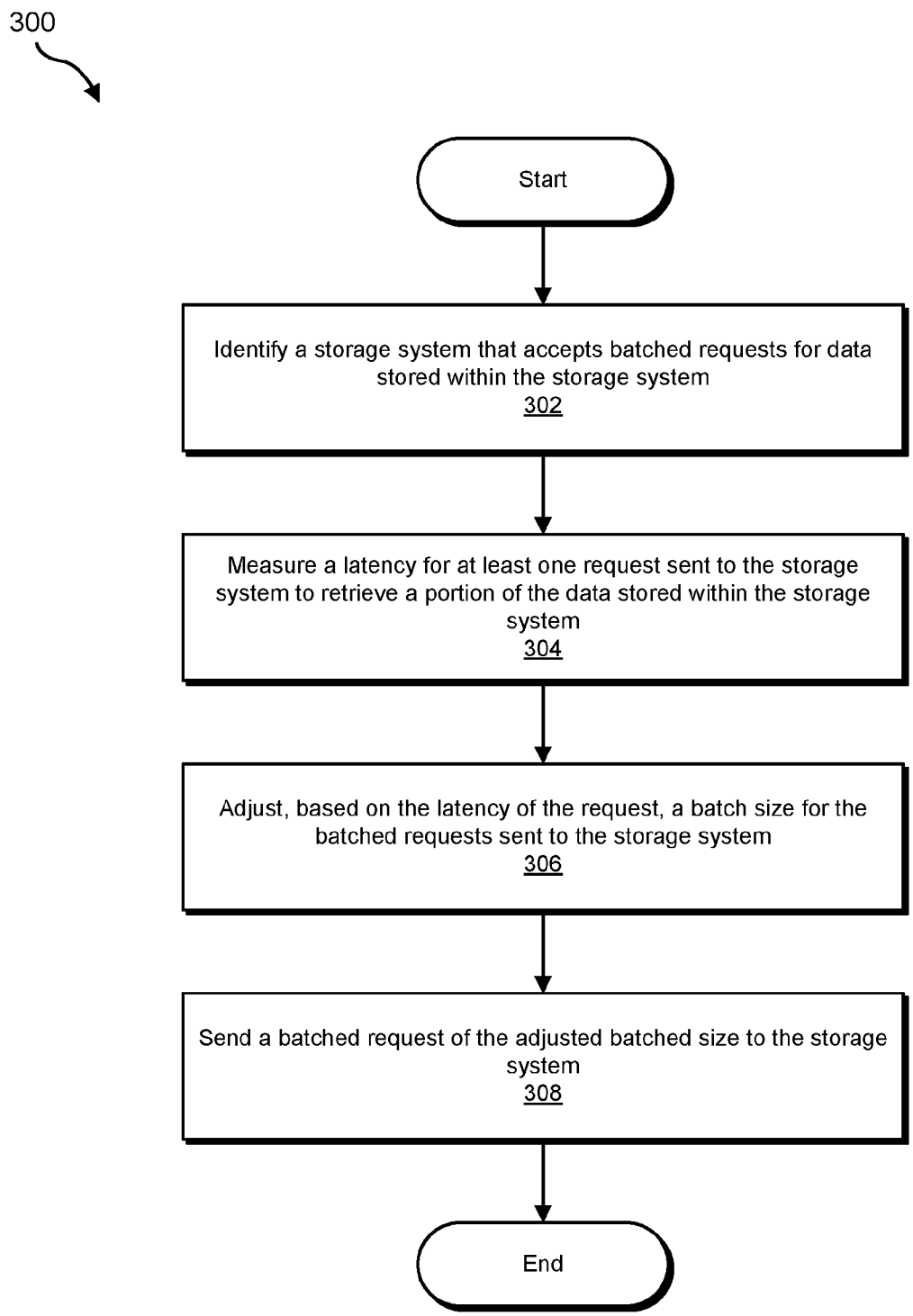
FIG. 3 is a flow diagram of an exemplary method for dynamically adjusting batch request sizes.

FIG. 3 is a flow diagram of an exemplary computer-implemented method 300 for dynamically adjusting batch request sizes. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a storage system that accepts batched requests for data stored within the storage system. For example, identification module 104 may, as part of computing device 202 in FIG. 2, identify storage system 208 that accepts batched requests for data 210 stored within storage system 208.

The term "storage system," as used herein, generally refers to any computing system or group of computing systems capable of storing data for retrieval. In some embodiments, a storage system may include and/or be part of a backup system that offers deduplication, such as VERITAS VELOCITY, MICROSOFT AZURE BACKUP, and/or ORACLE RECOVERY MANAGER. In some examples, a storage system may store backup images of computing systems for system restoration and/or provisioning. In some embodiments, a backup system may be distributed over one or more remote servers in various data centers (i.e., the cloud).

The term "request," as used herein, generally refers to any message sent to a storage system that specifies data to be retrieved from the storage system. For example, a request may be a read request. The term "batched requests," as used herein, generally refers to any grouping of requests. In some embodiments, batched requests may be aggregated as they are received and then sent to the storage system simultaneously. For example, all read requests received during a predefined interval may be batched. In another example, received requests may be aggregated until a set batch number is reached and then the batched requests may be sent. In some embodiments, all requests in a batched request may be returned by and/or from the storage system simultaneously.

Identification module 104 may identify the storage system in a variety of contexts. For example, identification module 104 may be part of a backup and/or provisioning system. In some embodiments, identification module 104 may be part of the storage system.

At step 304, one or more of the systems described herein may measure the latency for at least one request sent to the storage system to retrieve a portion of the data stored within the storage system. For example, measuring module 106 may, as part of computing device 202 in FIG. 2, measure latency 214 for at least one request 212 sent to storage system 208 to retrieve a portion of data 210 stored within the storage system 208.

The term "latency," as used herein, generally refers to any measurement of the speed and/or efficiency of a request sent to a storage system. In some embodiments, measuring module 106 may measure the latency as the number of input/output operations per second performed on the storage system over a predetermined time period. In other embodiments, measuring module 106 may measure the latency as the time it takes to complete a single request and/or the average of the time it takes to complete multiple requests.

In some embodiments, measuring module 106 may measure the latency at predetermined intervals. For example, measuring module 106 may measure the latency once every ten seconds, every minute, every ten minutes, or every hour. In other embodiments, measuring module 106 may measure the latency constantly. For example, measuring module 106 may keep a constant track of the input/output operations per second performed by the storage system and/or the average time it takes each request to complete.

At step 306, one or more of the systems described herein may adjust, based on the latency of the request, the batch size for the batched requests sent to the storage system. For example, adjusting module 108 may, as part of computing device 202 in FIG. 2, adjust, based on latency 214 of request 212, batch size 216 for the batched requests sent to storage system 208.

The term "batch size," as used herein, generally refers to any measurement used to define the size of a batch of requests. In some embodiments, the batch size may be a set number of requests, such as ten requests or fifty requests. In other embodiments, the batch size may be a time interval during which all requests received are placed into the same batch, such as one second or five seconds. In these embodiments, the number of requests in each batch may vary.

Adjusting module 108 may adjust the batch size in a variety of ways. For example, adjusting module 108 may adjust the batch size by increasing the batch size in response to determining that the latency of the request is higher than a previously measured latency that was previously used to set the batch size and/or decreasing the batch size in response to determining that the latency of the request is lower than a previously measured latency that was previously used to set the batch size. By increasing the batch size in response to higher latency, the systems described herein may enable more requests to be processed in fewer transactions, decreasing resource usage. By decreasing the batch size in response to lower latency, the systems described herein may allow requests to return more quickly without waiting on other requests to arrive and/or finish, increasing speed.

Additionally or alternatively, adjusting module 108 may adjust the batch size by comparing the measured latency to a table of latencies and corresponding optimal batch sizes. In another embodiment, adjusting module 108 may input the latency into a function that calculates optimal batch sizes based on latency. Additionally or alternatively, adjusting module 108 may use any suitable data structure and/or algorithm to derive an optimal request batch size from a request latency.

At step 308, one or more of the systems described herein may send a batched request of the adjusted batched size to the storage system. For example, sending module 110 may, as part of computing device 202 in FIG. 2, send batched request 218 of the adjusted batched size to storage system 208.

Sending module 110 may send the batched request in a variety of contexts. For example, sending module 110 may aggregate requests at a layer above the storage system and then send the batched request to the storage system. For example, sending module 110 may receive requests at an application programming interface layer and may batch the requests there before forwarding the requests to a retrieval mechanism in the storage system. In another example, sending module 110 may aggregate requests at a local computing system before forwarding the requests to remote instances of the storage system. In another embodiment, sending module 110 may aggregate requests as part of a single layer of the storage system.

Figure 4:
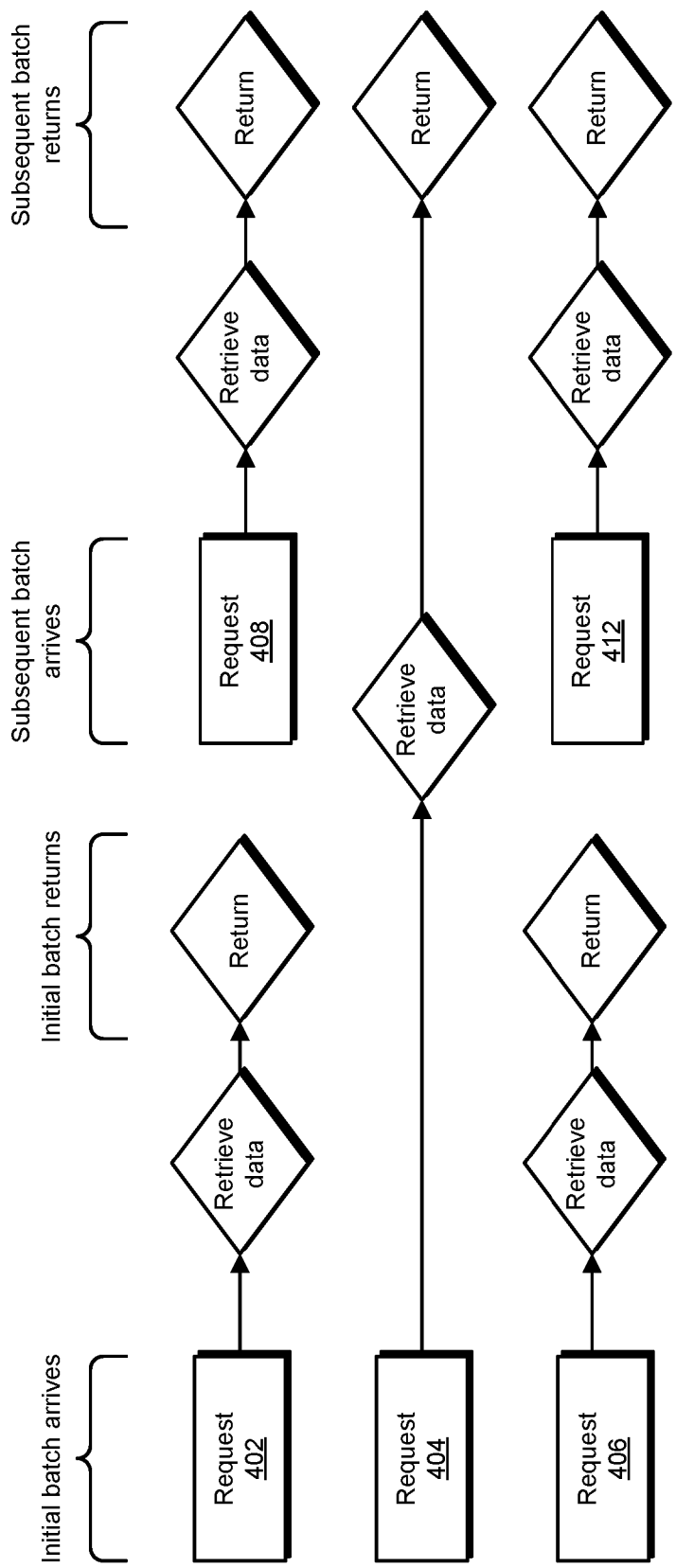
FIG. 4 is a block diagram of an exemplary computing system for additional improvements to request efficiency.

In one embodiment, systems described herein may determine that a certain request in the batched request is expected to take longer than a predetermined time limit to return, assign the certain request to a subsequent batched request, and return all requests in the batched request except the certain request. As illustrated in FIG. 4, an initial batch of requests may include requests 402, 404, and/or 406. In some examples, requests 402 and 406 may be expected to take a typical amount of time to retrieve data while request 404 may be expected to take longer than a predetermined time limit. In these examples, request 404 may be reassigned to a subsequent batch, allowing requests 402 and 406 to return more promptly. In this example, request 408 and/or 412 may be part of a subsequent batch of requests and request 404 may return at the same time as requests 408 and 412.

In some examples, request 404 may be expected to take longer than the predetermined time limit because request 404 may be expected to pass through several layers of systems. For example, request 404 may originate from an application programming interface operated by a client. In some examples, request 404 may be expected to take longer than the predetermined time limit to return because request 404 may share one or more characteristics with one or more previous requests that took longer than the predetermined time limit to return. In some embodiments, the systems described herein may record characteristics of requests that take longer than the predetermined time limit to retrieve data in order to predict future requests that may take longer than the predetermined time limit. In one example, request 404 may be expected to take longer than the predetermined time limit to retrieve data because of a race condition. For example, request 404 may be on a thread that may be attempting to access a data container that is currently locked.

Figure 5:
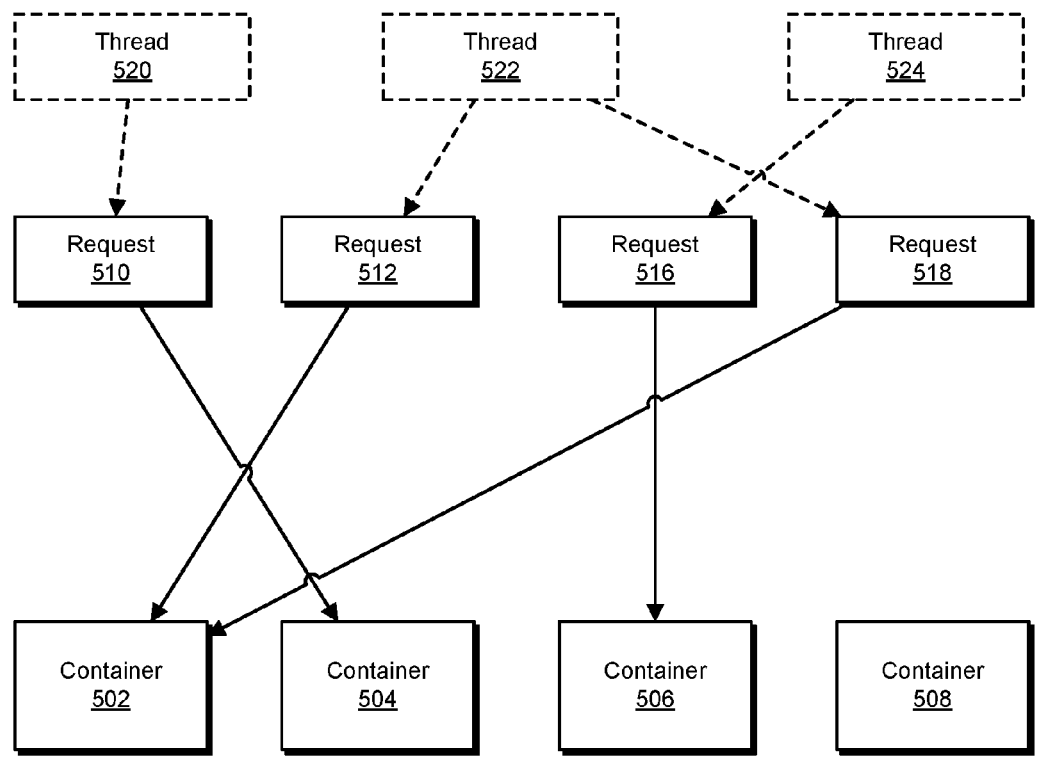
FIG. 5 is a block diagram of an exemplary computing system for additional improvements to request efficiency.

In one embodiment, the systems described herein may determine that a plurality of requests in the batched request are requesting data stored in a plurality of data containers and may sort the requests in the batched request according to the data containers from which the requests are requesting the data. As illustrated in FIG. 5, requests 510, 512, 518, and/or 516 may be directed at a storage system that includes containers 502, 504, 506, and/or 508. In some examples, request 510 may be directed at container 504, requests 512 and 518 may be directed at container 502, and/or request 516 may be directed at container 506. In these examples, the systems described herein may sort the requests so that requests 512 and 518 are adjacent due to requests 512 and 518 both being directed to container 502. Reordering the requests in this way may increase efficiency by reducing the number of times each data container must be opened and closed. In some embodiments, the systems described herein may cache the data from the data container, allowing subsequent requests to the same data container to return even faster.

In some embodiments, the systems described herein may assign the sorted requests to a plurality of threads in a multi-threaded system, such that each request to the same data container is assigned to the same thread within the plurality of threads. For example, as illustrated in FIG. 5, the systems described herein may assign request 510 to thread 520, requests 512 and 518 to thread 522, and/or request 516 to thread 524. By assigning requests to threads based on data container, the systems described herein may prevent race conditions where two or more threads attempt to retrieve data from the same data container, potentially causing one thread to hang if the other thread has locked the data container while retrieving the data.

As described in connection with method 300 above, the systems and methods described herein may improve the efficiency of read requests made to storage systems in a variety of ways. The systems described herein may measure the latency of requests and may adjust request batch size accordingly. The systems described herein may also sort requests within a batch according to container, increasing the efficiency of read operations and reducing the chances of race conditions. In addition, the systems described herein may reassign slow requests to subsequent batches in order to allow the remaining requests in the batch to return more quickly. By increasing read request efficiency in these ways, the systems described herein may speed up provisioning from storage systems, increasing overall provisioning efficiency and reducing user frustration.

Figure 6:
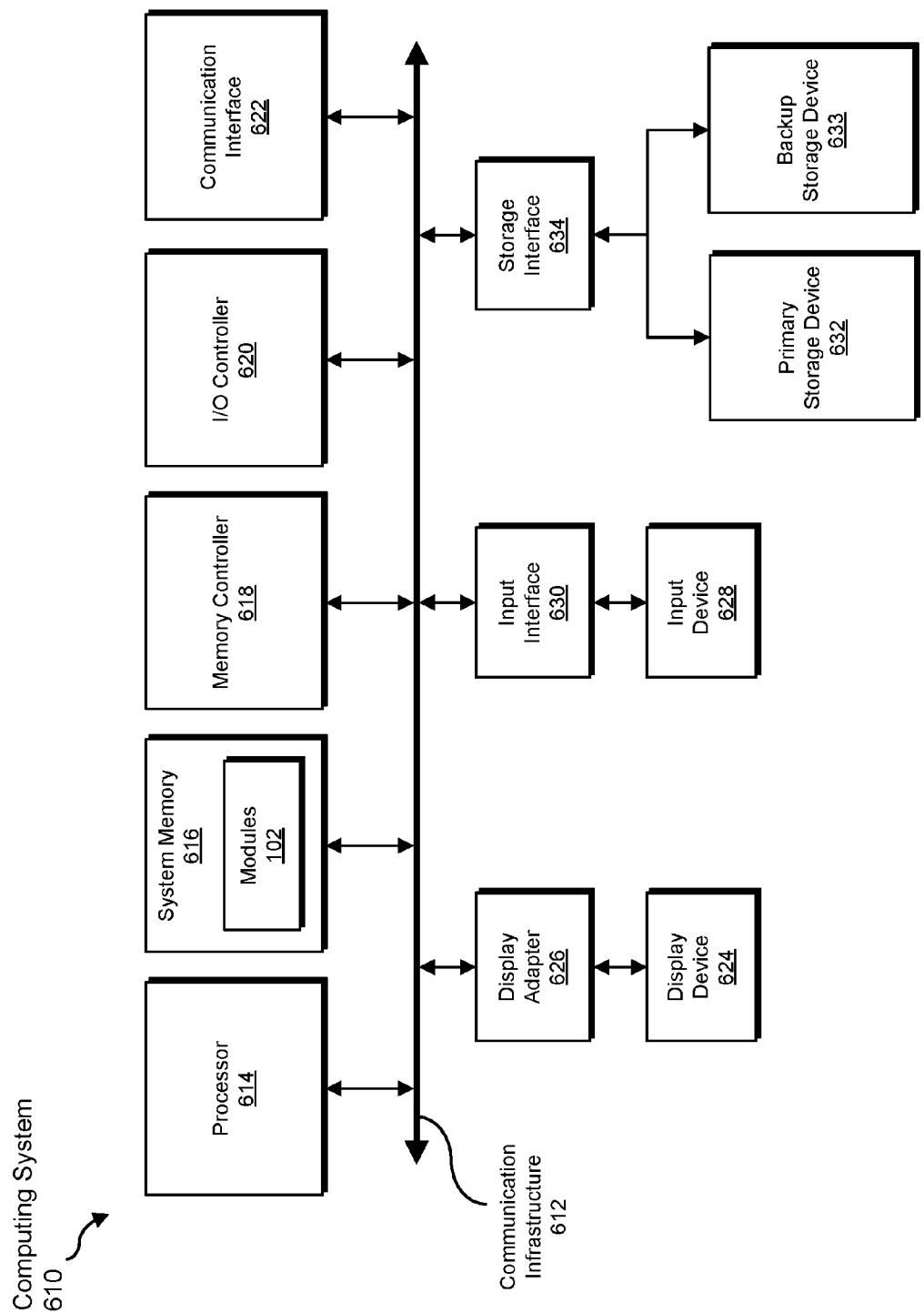
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
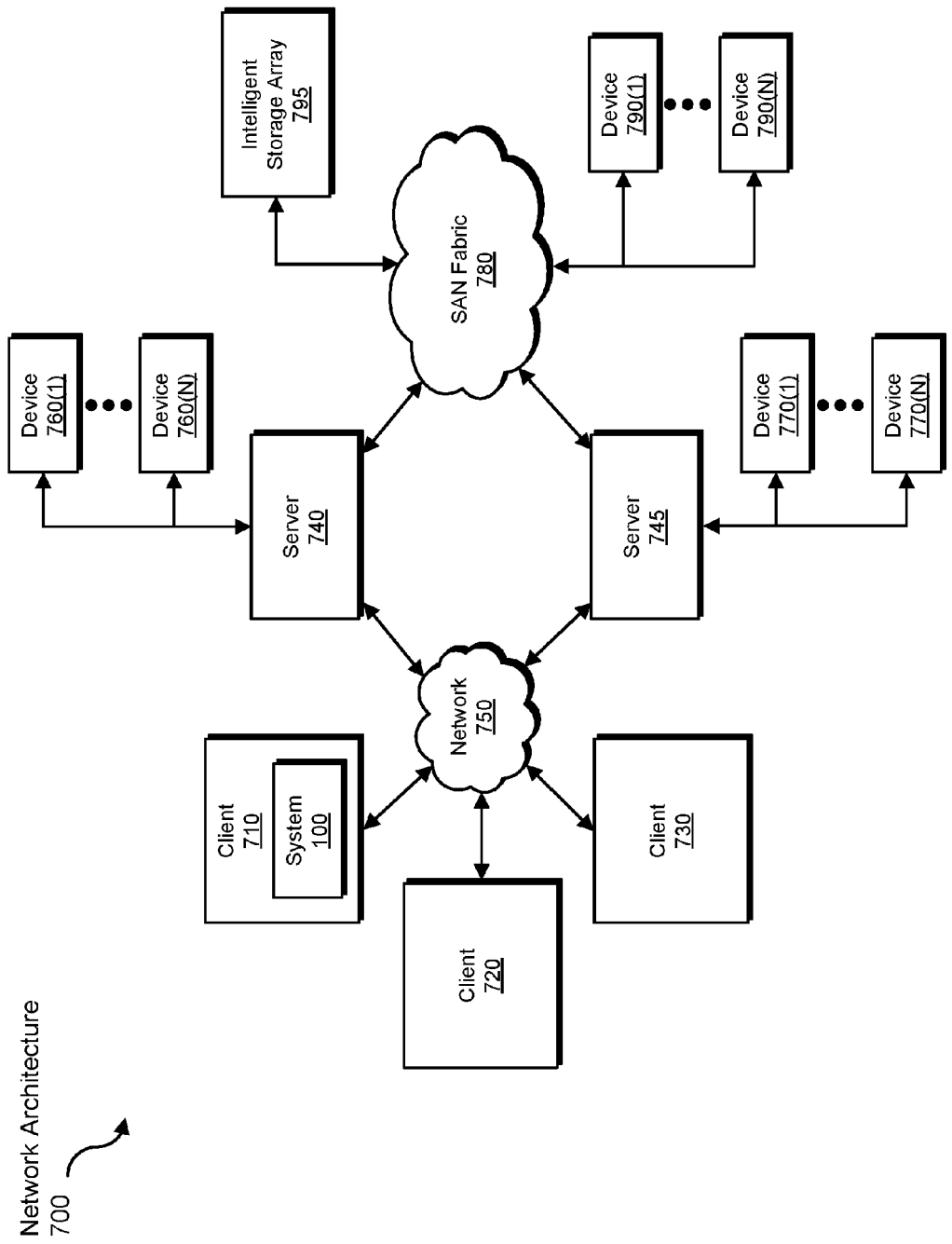
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for dynamically adjusting batch request sizes.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive latency data to be transformed, transform the latency data by comparing it to previous latency data, output a result of the transformation to a table, function, and/or other data structure or algorithm that compares latency to optimal batch size, use the result of the transformation to calculate a new batch size, and store the result of the transformation to a batch size setting. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for dynamically adjusting batch request sizes, at least a portion of the method being performed by a computing device comprising at least one processor, the method comprising:
    identifying a storage system that accepts batched requests for data stored within the storage system;
    measuring a latency for at least one request sent to the storage system to retrieve a portion of the data stored within the storage system;
    configuring a batched request for the storage system by:
        determining that a plurality of requests in the batched request are requesting data stored in a plurality of data containers within the storage system;
        sorting the requests in the batched request according to the data containers the requests are requesting the data from; and
        assigning the sorted requests to a plurality of threads in a multi-threaded system, wherein each request to the same data container is assigned to the same thread within the plurality of threads; and adjusting, based on the latency of the request, a batch size for the batched request; and
sending the configured batched request to the storage system.

2. The computer-implemented method of claim 1, wherein adjusting the batch size comprises at least one of:
increasing the batch size in response to determining that the latency of the request is higher than a previously measured latency that was previously used to set the batch size; and
decreasing the batch size in response to determining that the latency of the request is lower than a previously measured latency that was previously used to set the batch size.

3. The computer-implemented method of claim 1, further comprising:
determining that a certain request in the batched request is expected to take longer than a predetermined time limit to return;
assigning the certain request to a subsequent batched request; and
returning all requests in the batched request except the certain request.

4. The computer-implemented method of claim 3, wherein the certain request is expected to take longer than the predetermined time limit because the certain request is expected to pass through a plurality of layers of systems.

5. The computer-implemented method of claim 3, wherein the certain request is expected to take longer than the predetermined time limit because the certain request shares at least one characteristic with at least one previous request that took longer than the predetermined time limit.

6. The computer-implemented method of claim 5, further comprising recording characteristics of requests that take longer than the predetermined time in order to predict future requests that are expected take longer than the predetermined time limit.

7. The computer-implemented method of claim 1, wherein:
the storage system comprises a backup storage system; and
the batched request comprises a batch of read requests made in order to provision a system from the backup storage system.

8. A system for dynamically adjusting batch request sizes, the system comprising:
an identification module, stored in memory, that identifies a storage system that accepts batched requests for data stored within the storage system;
a measuring module, stored in memory, that measures a latency for at least one request sent to the storage system to retrieve a portion of the data stored within the storage system;
an adjusting module, stored in memory, that configures a batched request for the storage system by:
adjusting, based on the latency of the request, a batch size for the batched request;
determining that a plurality of requests in the batched request are requesting data stored in a plurality of data containers within the storage system;
sorting the requests in the batched request according to the data containers the requests are requesting the data from; and
assigning the sorted requests to a plurality of threads in a multi-threaded system, wherein each request to the same data container is assigned to the same thread within the plurality of threads;

a sending module, stored in memory, that sends the configured batched request to the storage system; and
at least one physical processor configured to execute the identification module, the measuring module, the adjusting module, and the sending module.

9. The system of claim 8, wherein the adjusting module adjusts the batch size by at least one of:
increasing the batch size in response to determining that the latency of the request is higher than a previously measured latency that was previously used to set the batch size; and
decreasing the batch size in response to determining that the latency of the request is lower than a previously measured latency that was previously used to set the batch size.

10. The system of claim 8, further comprising a batch adjustment module, stored in memory, that:
determines that a certain request in the batched request is expected to take longer than a predetermined time limit to return;
assigns the certain request to a subsequent batched request; and
returns all requests in the batched request except the certain request.

11. The system of claim 10, wherein the certain request is expected to take longer than the predetermined time limit because the certain request is expected to pass through a plurality of layers of systems.

12. The system of claim 8, wherein the batch size comprises a time interval during which all requests received are placed into a same batch.

13. The system of claim 8, wherein the batch size comprises a set number of requests.

14. The system of claim 8, wherein:
the storage system comprises a backup storage system; and
the batched request comprises a batch of read requests made in order to provision a system from the backup storage system.

15. A non-transitory computer-readable medium comprising one or more computer-readable instructions that, when executed by at least one processor of a computing device, cause the computing device to:
identify a storage system that accepts batched requests for data stored within the storage system;
measure a latency for at least one request sent to the storage system to retrieve a portion of the data stored within the storage system;
configure a batched request for the storage system by:
adjusting, based on the latency of the request, a batch size for the batched requests sent to the storage system;
determining that a plurality of requests in the batched request are requesting data stored in a plurality of data containers within the storage system;
sorting the requests in the batched request according to the data containers the requests are requesting the data from; and
assigning the sorted requests to a plurality of threads in a multi-threaded system, wherein each request to the same data container is assigned to the same thread within the plurality of threads; and
send the configured batched request to the storage system.

16. The non-transitory computer-readable medium of claim 15, wherein the one or more computer-readable instructions cause the computing device to adjust the batch size by at least one of:

increasing the batch size in response to determining that the latency of the request is higher than a previously measured latency that was previously used to set the batch size; and decreasing the batch size in response to determining that the latency of the request is lower than a previously measured latency that was previously used to set the batch size.

17. The non-transitory computer-readable medium of claim 15, wherein the one or more computer-readable instructions cause the computing device to:

determine that a certain request in the batched request is expected to take longer than a predetermined time limit to return;

assign the certain request to a subsequent batched request; and return all requests in the batched request except the certain request.

18. The non-transitory computer-readable medium of claim 17, wherein the certain request is expected to take longer than the predetermined time limit because the certain request is expected to pass through a plurality of layers of systems.

19. The non-transitory computer-readable medium of claim 15, wherein the one or more computer-readable instructions cause the computing device to measure the latency for the at least one request by measuring the latency as a number of input/output operations per second performed on the storage system over a predetermined time period.

20. The non-transitory computer-readable medium of claim 19, wherein the one or more computer-readable instructions cause the computing device to measure the latency for the at least one request by measuring the latency at predetermined intervals.

* * * * *